US008354914B2

(12) United States Patent
Buckingham et al.

(10) Patent No.: US 8,354,914 B2

(45) Date of Patent: Jan. 15, 2013

(54) REDUCED POWER ELECTRONIC LOCK SYSTEM

(75) Inventors: Duane W. Buckingham, Old Lyme, CT (US); Philipp A. Roosli, Niantic, CT (US); Gregory F. Scheurer, Mystic, CT (US)

(73) Assignee: Inncom International, Inc., Niantic, CT (US)

( * ) Notice: Subject to any disclaimer, the term of this patent is extended or adjusted under 35 U.S.C. 154(b) by 1292 days.

(21) Appl. No.: 11/082,577

(22) Filed: Mar. 17, 2005

(65) Prior Publication Data

US 2006/0164206 A1 Jul. 27, 2006

Related U.S. Application Data

(60) Provisional application No. 60/647,659, filed on Jan. 27, 2005, provisional application No. 60/647,741, filed on Jan. 27, 2005.

(51) Int. Cl.
*G05B 19/00* (2006.01)

(52) U.S. Cl. ........................................................ 340/5.6

(58) Field of Classification Search ................... 340/5.6, 340/5.66, 5.7, 5.73, 5.64, 5.61, 542, 5.2, 340/5.1

See application file for complete search history.

(56) References Cited

U.S. PATENT DOCUMENTS 3,979,647 A * 9/1976 Perron et al. .................... 70/277
4,912,460 A * 3/1990 Chu ............................ 340/5.67
4,929,005 A 5/1990 Heinen
5,317,309 A * 5/1994 Vercellotti et al. ........... 340/10.5
5,497,641 A * 3/1996 Linde et al. .................. 340/5.72
5,936,544 A * 8/1999 Gonzales et al. ............ 340/5.62
5,979,754 A 11/1999 Martin et al.
6,161,005 A * 12/2000 Pinzon ......................... 340/5.72
6,275,143 B1 * 8/2001 Stobbe ......................... 340/10.34
6,359,547 B1 * 3/2002 Denison et al. .............. 340/5.73
6,535,136 B1 3/2003 Rodenbeck et al.
6,714,118 B1 * 3/2004 Frolov et al. ................... 340/5.7
6,720,861 B1 4/2004 Rodenbeck et al.
6,867,685 B1 * 3/2005 Stillwagon ................... 340/5.64
6,967,562 B2 11/2005 Menard et al.
7,346,331 B2 3/2008 Taylor et al.
2003/0098777 A1 5/2003 Taylor et al.
2004/0183652 A1 * 9/2004 Deng et al. ................... 340/5.53
2005/0040933 A1 * 2/2005 Huntzicker .................. 340/5.72
2006/0038654 A1 * 2/2006 Khalil ............................ 340/5.6
2006/0103533 A1 * 5/2006 Pahlavan et al. ........... 340/572.1

FOREIGN PATENT DOCUMENTS

DE 101 04 010 8/2002
DE 102 06 700 8/2003
EP 0 320 373 6/1989
EP 1 244 068 9/2002
JP 10025935 A 1/1998
JP 2004293151 A 10/2004

(Continued)

OTHER PUBLICATIONS

International Search Report; PCT/US2006/004650; Jun. 6, 2006.

(Continued)

*Primary Examiner* — Vernal Brown

(74) *Attorney, Agent, or Firm* — Seager Tufte & Wickhem LLC.

(57) ABSTRACT

An electronic lock system including an electronic lock disposed in a door and a device external to the door disposed for wirelessly providing power to the electronic lock.

34 Claims, 5 Drawing Sheets

FOREIGN PATENT DOCUMENTS

| | | |
|---|---|---|
| NL | 1 022 525 | 8/2004 |
| WO | WO 98/43196 | 10/1998 |
| WO | WO 99/57676 | 11/1999 |
| WO | WO 99/61732 | 12/1999 |
| WO | WO 00/77330 | 12/2000 |
| WO | WO 02/29187 | 4/2002 |
| WO | WO 03/071060 | 8/2003 |
| WO | WO 2005/054609 | 6/2005 |

OTHER PUBLICATIONS

International Search Report; PCTUS2006/004651; May 24, 2006.

* cited by examiner

REDUCED POWER ELECTRONIC LOCK SYSTEM

CROSS REFERENCE TO RELATED APPLICATIONS

This patent application claims priority to a provisional application that was filed on Jan. 27, 2005, Ser. No. 60/647,659, the entire contents of which are incorporated herein by reference. This application is also related to U.S. Provisional Patent Application Ser. No. 60/647,741, filed on Jan. 27, 2005, the entire contents of which are herein incorporated by reference. This application is further related to U.S. Nonprovisional patent application Ser. No. 60/647,741, entitled "Proximity Wake-Up Activation of Electronic Circuits", filed on Mar. 17, 2005, the entire contents of which are herein incorporated by reference.

BACKGROUND OF THE INVENTION

The invention relates generally to lock systems and, more particularly, to an electronic lock system for allowing access to an individual unit of a multi-unit building.

Electronic locks are typically powered by either batteries or a wired power source. In the case of hotels, motels, inns, and the like, practically all electronic locks are battery powered. In either case, the functionality of these locks, particularly on guest room entry doors, are critical to the operation of the property.

For battery-powered locks, there is a significant purchase and labor expense associated with periodically replacing the batteries which is typically required about every two years. For hotels with standalone electronic lock systems, battery replacement scheduling must be performed on the basis of "shortest expected battery life span", regardless of whether some batteries may have continued functioning for several months or even a year beyond the replacement point in time. For locks that are part of a centrally-controlled system, the expense can be slightly mitigated by locks which are able to report a low-battery condition. Batteries in such lock systems can then be replaced on an "as required" schedule, but there is still significant expense involved in monitoring these locks and then, as needed, physically replacing lapsed batteries.

For electronic locks that are powered from a wired source external to the door, there is a very significant initial installation cost, since the power source must be installed; wires must be run from that location to the periphery of the door, and doors must typically be core drilled to permit running the wires from the point on the periphery to the lock device itself. These systems also must rely on either flexible wiring on the hinged side of the door or dual contacts on one edge of the door which are mated to a second set of dual contacts on the door jam or strike plate. In either case, there is a mechanical failure rate inherent in the wired power supply, and there is also a significant risk that, if the power supply fails, the lock will cease functioning unless there is provision for a battery back-up, either in the lock or somehow interconnected with the external power source. There are also potential fire code problems related to altering doors by core drilling or otherwise changing the structure of the door.

In battery-powered electronic locks, it is estimated that 80% or more of power usage is related to maintaining the electronic circuitry needed to "read" the various types of access cards (e.g., magnetic stripe cards, smart cards and proximity cards), store access events in memory, operate LED indicators and so forth, and to normal battery leakage or self-discharge. The lock must be kept in a continuous standby state waiting for the next access card event to occur. In on-line systems, there is the added requirement to communicate various data via wireless means to and from some form of gateway or electronic relay device that is connected by wired or wireless means to a central computing server.

In these battery-powered locks, less than 20% of power usage is directly related to latching and unlatching activities. Such power usage, averaged over time, is on the order of 2 $\mu$A-10 $\mu$A.

In addition to the problem areas noted above, battery-powered electronic locks are typically bulky and not aesthetically pleasing. Principally, the bulkiness of the lock assembly is caused by the need to accommodate the battery pack (e.g., four AA batteries), an access card slot (for magnetic stripe and smart cards), and the circuitry needed to process and store entry and, in some cases, egress activities.

Therefore, a lock system is desired which requires less maintenance, uses reduced power, has fewer components, and is of minimal size.

SUMMARY OF THE INVENTION

To overcome the above problems, the invention eliminates the need for a battery pack in the door lock unit and in some embodiments relocates at least one of the access card read/write assembly and associated circuitry, control circuitry, and memory storage circuitry from the door lock unit to a location in close proximity to the door and to which continuous power is supplied. In some exemplary embodiments of the invention, this means that some or all of the lock system intelligence is removed from the door lock unit itself and transferred to a more convenient, accessible location to which continuous power can be supplied.

In one embodiment of the invention, an electronic lock system is provided including an electronic lock disposed in a door and a controller disposed proximate to the door. The controller includes an access device by which the electronic lock may be accessed. The controller is disposed for wirelessly communicating with the electronic lock and wirelessly providing power to the electronic lock.

In another embodiment, an electronic lock system is provided including an electronic lock disposed in a door and a controller disposed proximate to the door and connected to a power source for providing power to the controller, where the controller includes an access device by which the electronic lock may be accessed, where the controller is disposed for wirelessly communicating with the electronic lock, and where the electronic lock includes a dynamo for providing power to the lock.

In still another embodiment, the invention provides a method of operating an electronic lock disposed in a door, the method including presenting an access card to an access device of a controller disposed proximate to the door, the access card including stored identification data, processing the identification data at the controller, generating a wireless activation signal at the controller where the identification data is acceptable, transmitting the activation signal to the electronic lock, and activating and rendering operable the electronic lock in response to the activation signal, where when operable the electronic lock is powered by energy from a storage device of the electronic lock which is charged by a wireless signal generated by the controller.

In a further embodiment of the invention, an electronic lock system is provided including an electronic lock disposed in a door and a device disposed external to the door capable of wirelessly providing power to the electronic lock, where the electronic lock includes an access device by which the lock may be accessed.

The above discussed and other features and advantages of the present invention will be appreciated and understood by those skilled in the art from the following detailed description and drawings.

BRIEF DESCRIPTION OF THE DRAWINGS

Referring now to the drawings wherein like numerals designate like components.

DETAILED DESCRIPTION OF THE PREFERRED EMBODIMENT

Figure 1:
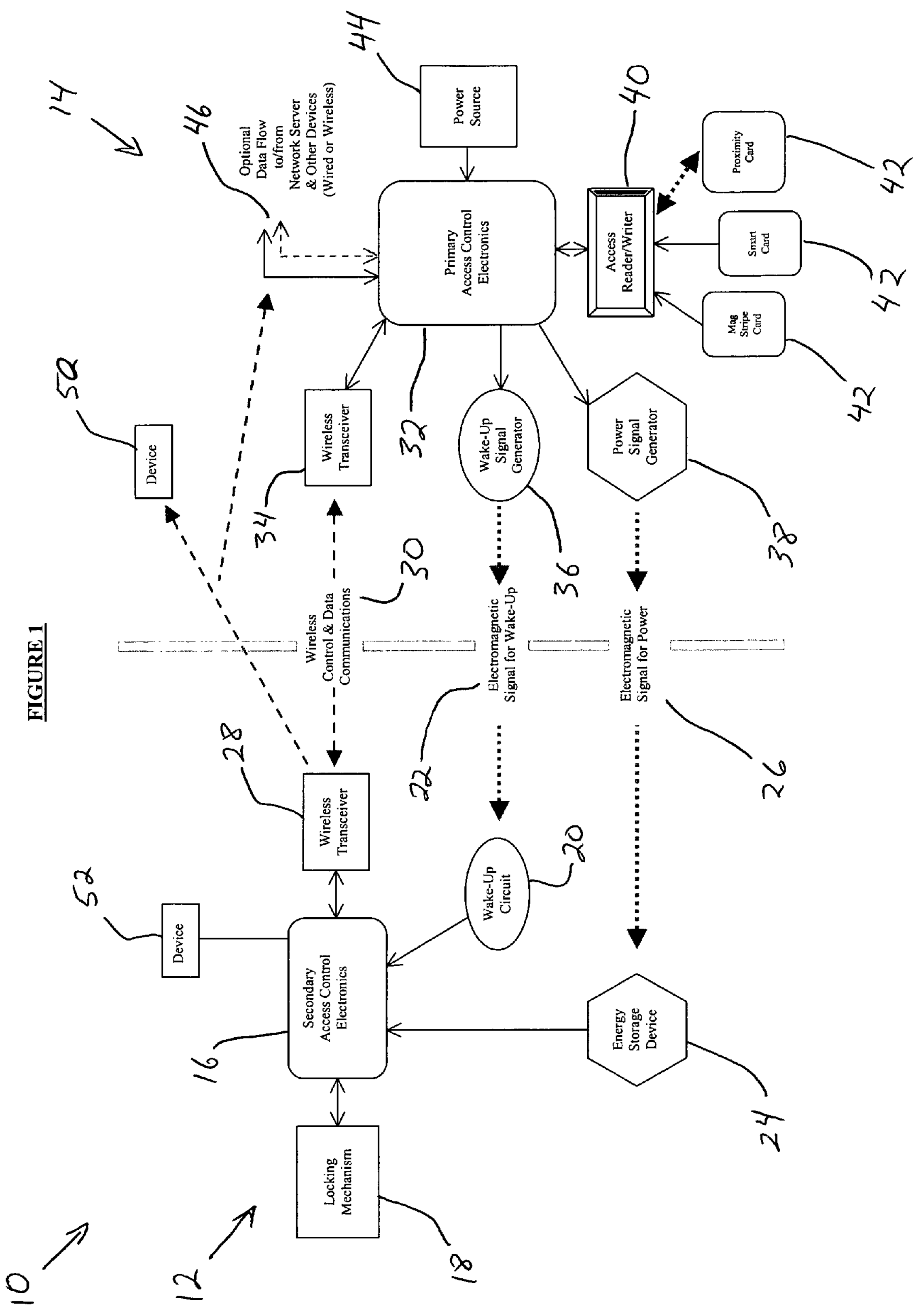
FIG. 1 is a schematic representation of a lock system in one exemplary embodiment of the invention.

FIG. 1 shows an exemplary electronic lock system 10 in accordance with an embodiment of the invention. The system 10 includes a door lock unit 12 and a corresponding lock control assembly 14. As will be discussed herein at length, the control assembly 14 communicates with, controls the operations of, and provides power to the door lock unit 12.

The door lock unit 12 includes secondary access control electronics 16 having a simple microprocessor (not shown) and an actuator (not shown) that is connected to a locking mechanism 18 and is capable, upon command of the control electronics 16, of actuating the locking mechanism 18 into a locked or unlocked position. The door lock unit 12 further includes a wake-up circuit 20 which is powered by electromagnetic signals 22 received from the lock control assembly 14 and which is connected to the secondary access control electronics 16. The door lock unit 12 also includes an energy storage device 24 (e.g., a super-capacitor, a solar panel arrangement, etc.) that receives electromagnetic signals 26 from the lock control assembly 14, converts those to capacitively stored electrical energy, and is connected to the secondary access control circuit 16. The door lock unit 12 additionally includes a wireless transceiver 28 connected to the secondary access control circuit 16 and capable of engaging in wireless communications 30 with the lock control assembly 14.

The door lock unit 12 is advantageously of a minimal size. In the present embodiment, the unit 12 (absent the locking mechanism 18) is no larger than a typical match box. This means that the electronic door lock unit 12 is essentially no larger than a traditional mechanical door lock assembly.

The lock control assembly 14 is located in close proximity to the door lock unit 12. Such location could be, for example, collocated with a doorbell plate on a wall immediately outside of an entry door or disposed at or within an entry light switch, a do not disturb/make up room plate, an illuminated room number plate or any other device in proximity to the door lock unit.

The lock control assembly 14 includes primary access control electronics 32 having a microprocessor (not shown) and an electronic memory (not shown). A wireless transceiver 34 is connected to the primary access control electronics 32 and is disposed for engaging the door lock unit 12 via the wireless communications 30. The control assembly 14 further includes a wake-up signal generator 36 which is connected to the primary access control electronics 32 and which generates the electromagnetic wake-up signal 22. A power signal generator 38 is also connected to the primary access control electronics 32. The generator 38 is disposed for generating the electromagnetic power signal 26 which is received by the storage device 24 of the door lock unit 12.

The power signal generator 38 generally comprises any device capable of wirelessly transmitting the electromagnetic signals 26. The electromagnetic signals 26 may take any suitable form such as radio frequency (RF) signals, light signals, etc. The energy storage device 24 generally comprises any corresponding device capable of receiving such electromagnetic signals 26 and configured for converting the signals 26 into electrical energy. For example, the power signal generator 38 and the energy storage device 24 may include traditional AM/FM antennae where the electromagnetic signals 26 include RF signals. Alternatively and/or additionally, the power signal generator 38 may comprise a controlled or uncontrolled light source such that the electromagnetic signals 26 include light signals. The energy storage device 24 may then correspondingly comprise a solar panel arrangement for receiving the light signals 26 and converting them to electrical power. Alternatively and/or additionally, the power signal generator 38 and the energy storage device 24 may comprise split air gap transformers or any other type of magnetic or capacitive coupling arrangements suitable for facilitating transmission and reception of the electromagnetic signal 26.

The control assembly 14 also includes an access reader/writer 40 which is connected to the primary access control electronics 32 and which is configured for reading data from access cards 42 such as magnetic stripe cards, smart cards, and proximity cards. The lock control assembly 14 is powered by a power source 44, which could be, for example, a switch mode power supply, a transformer, a traditional or rechargeable battery pack or any combination thereof, and which provides continuous power to the primary access control electronics 32. The lock control assembly 14 may be connected to, and in communication with, a network (LAN, WAN, etc.), an associated server, and/or additional peripheral devices by way of a network connection 46. The lock control assembly 14 may communicate with the network via any suitable protocol (e.g., TCP/IP, UDP/IP, Inncom International, Inc's proprietary P5 Protocol, etc.). The connection 46 may be wired or wireless, as desired. Wireless communication between the control assembly 14 and the network and/or between the control assembly 14 and the door lock unit 12 is preferably conducted via radio frequency (RF) communication, but may alternatively and/or additionally utilize infrared (IR) or other types of communication (e.g., ultrasound (U/S), etc.). Such wireless RF communication may utilize, for example, 802.11b radio frequency protocol, WI-FI, Bluetooth®, 802.15.4, or any other suitable wireless protocol.

The operation of the system 10 will now be discussed with reference to FIG. 1. Notably, the door lock unit 12 does not include an independent power source such as a battery. This, as mentioned, results in the advantageously small size of the door lock unit. The door lock unit 12, however, does have certain power requirements for operating the locking mechanism 18, for communicating via the wireless transceiver 28, etc. The power required to carry out these functions and more originates from the power signal generator 38 of the lock control assembly 14. The generator 38 generates the electromagnetic power signals 26 which essentially comprise pulsed or continuous electromagnetic emissions. Such emissions are received by the energy storage device 24 and are converted to stored electrical energy. The conversion of the electromagnetic emissions to electrical energy is done in much the same manner as known operations concerning RFID tags. In the case of the invention, the electrical energy is stored in a capacitive circuit of the energy storage device 24 for on-demand use by the secondary access control circuit 16 of the door lock unit 12.

An example of a typical operation of the system 10 begins with insertion of a magnetic stripe or smart access card 42 in a wall slot component of the access reader/writer 40. The latter reads data encoded in the access card 42 and sends the data from the reader/writer 40 to the primary access control electronics 32. The control electronics 32 determine whether the data is appropriate to permit access to a latched door. This determination involves, for example, a comparison of the read data to stored data which is stored locally in the control electronics 32 or which is accessed remotely via the network connection 46. If the determination is positive, the control electronics 32 then instruct the wake-up signal generator 36 to transmit the electromagnetic wake-up signal 36 to the wake-up circuit component 20 of the door lock unit 12. It is noted that this wake-up signal 22 is distinctly different from the electromagnetic power signal 26 generated by the power signal generator 38.

Upon receipt of a wake-up signal 22, the wake-up circuit 20 sends an electrical charge to the secondary access control electronics 16 which awakens and is activated. The wake-up signal generator 36, the emitted wake-up signal 22, the wake-up circuit 20, and the resulting activation of the door lock unit 10, may for example comprise that which is described in related U.S. patent application Ser. No. 60/647,741 entitled “PROXIMITY WAKE-UP ACTIVATION OF ELECTRONIC CIRCUITS” which was filed on Jan. 26, 2005 and which is incorporated by reference herein in its entirety.

Immediately after transmission of the wake-up signal 22, the primary control electronics 32 instruct the wireless transceiver 34 to transmit a wireless command to the secondary control electronics 16 to unlatch the locking mechanism 18. The secondary control electronics 16, powered by the energy storage device 24 as discussed above, receives such command through the wireless transceiver 28 connected to it, and, upon receipt of such command, the secondary electronics 16 trigger an actuator which causes the locking mechanism 18 to unlatch. The secondary control electronics 16 then transmits back to the primary control 32 (through the path of the wireless transceivers 28, 34) acknowledgement of the unlatching activity. The actuator which affects the unlocking of the locking mechanism 18 may be of any suitable known configuration and may, for example, be manufactured from existing discreet components or by using nano-technology to create a miniaturized version of such actuator.

All of the above activities are stored in memory in the primary control electronics 32. This stored activity record may be utilized as desired. For example, the record may be communicated to the network or to other devices via the connection 46, or may be accessed via a hand-held unit such as a personal digital assistant (PDA) or other similar equipment.

The system 10 may utilize multiple configurations of antennae (not shown) for facilitating the electromagnetic transmissions 22, 26, and if appropriate 30, between the lock control assembly 14 and the door lock unit 12. That is, for example, there could be a single antenna in the lock control assembly 14 for the wake-up and power signal transmissions 22 and 26, respectively, two antennae in the door lock unit 12 to receive those transmissions, and a separate antenna in each of the door lock unit 12 and the lock control assembly 14 for transmitting and receiving the electromagnetic control and data communications 30. In this case, there would be a total of five antennae in the configuration. Another example includes the use of a single antenna in each of the lock control assembly 14 and the door lock unit 12 for transmission and/or receipt of all electromagnetic traffic between the two parts 12 and 14 of the system 10. That is, in this case, the system 10 would only include two antennae.

The variations on the above-described sequence of operation are many. For example, instead of being based upon magnetic stripe or smart card access, the system may employ proximity recognition technology. That is, the reader 40 may be configured to access and read data stored within access cards 42 which are commonly referred to as proximity cards. When such proximity card 42 is in sufficient proximity to the lock control assembly 14, the proximity card 42 is activated by the pulses emitted by the power signal generator 38. Once activated, the proximity card 42 sends an encoded radio frequency response identifying itself, i.e., an RF response including identification data. This response is then processed and evaluated by the primary control electronics 32, as discussed above with respect to the processing of magnetic stripe/smart card data. If the identification data is verified, then the primary control electronics 32 trigger the same sequence of events as described above. That is, the door lock unit 12 is activated and the locking mechanism 18 is actuated (i.e., opened). If the identification data of the proximity card (or the data read from a magnetic stripe or smart card, as in the above description) is not verified by the primary control electronics 32, then access is not granted to the attempted entrant. An indication of the denial may be communicated to the attempted entrant (e.g., visual display, audible sound, etc.) and a record of the attempted entrance may be stored in the primary control 32 and/or transmitted to the network or other devices via the connection 46.

The electronic lock system 10 provides a door lock unit 12 of significantly reduced size and simplified construction. The lock unit 12 includes no internal power source, such as a battery, and thus requires substantially reduced maintenance. Yet, the lock unit 12 remains in a state from which it may be activated at any time and an efficient functionality of the lock unit 12 is provided.

Figure 2:
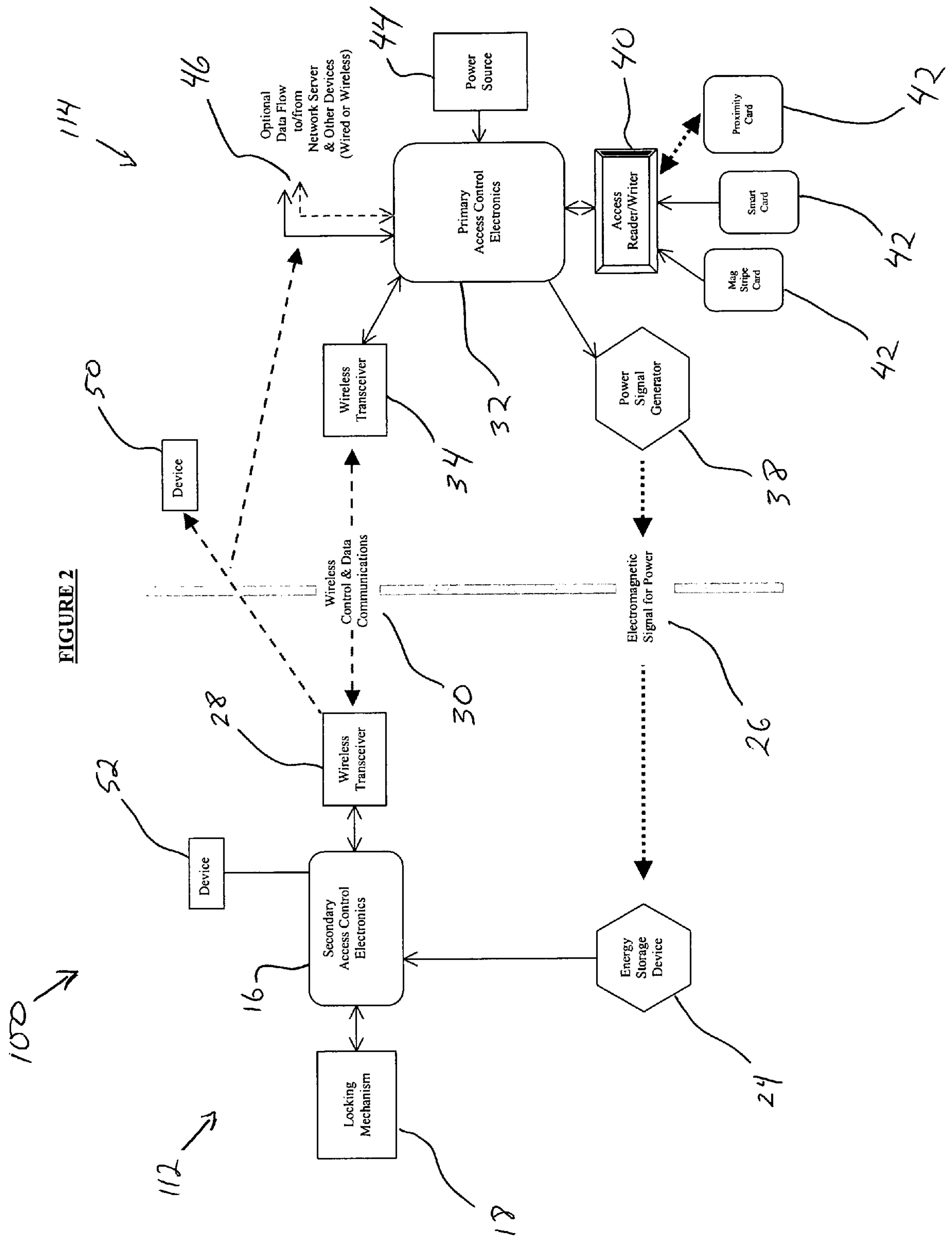
FIG. 2 is a schematic representation of a lock system in another embodiment of the invention.

An electronic lock system 100 in an alternative embodiment of the invention is shown in FIG. 2. The system 100 resembles the system 10 and includes many of the features and provisions thereof. Common elements are represented herein and throughout by consistent reference numerals and, for the sake of brevity, are not reintroduced nor unnecessarily re-described. The system 100 significantly differs from the system 10 in that the former does not include the wake-up signal generator 36 nor the wake-up circuit 20 of the latter. Instead, in the system 100, the secondary access control electronics 16 are maintained in a constant ready state by a continuous supply of power from the energy storage device 24. That is, the power signal generator 38 of the lock control assembly 14 continuously emits electromagnetic pulses 26 which are received by the storage device 24 and converted to energy which is used to provide the secondary control electronics 16 with continuous power.

The electronic lock system 100 operates similarly to the system 10 with the absence of the described wake-up/activation procedure. That is, the access reader 40 reads data from a potential entrant’s access card 42; the primary control electronics 32 verify the authenticity of the read data; if verification occurs, the control signal 30 is sent from the primary control 32 to the secondary control electronics 16 (note, no power-up activation of the secondary electronics 16 is required; the secondary electronics 16 are continuously in an activated state); and the secondary control electronics 16 unlock the locking mechanism 18 via the actuator and confirm the unlocking to the primary electronics 32 via the wireless transceivers 28 and 34.

The system advantageously reduces the already small size of the door lock unit 112 and further simplifies the unit 112 by removal of the wake-up circuit. Additionally, the unlocking procedure is streamlined by removal of the door lock unit 112 activation procedure.

Figure 3:
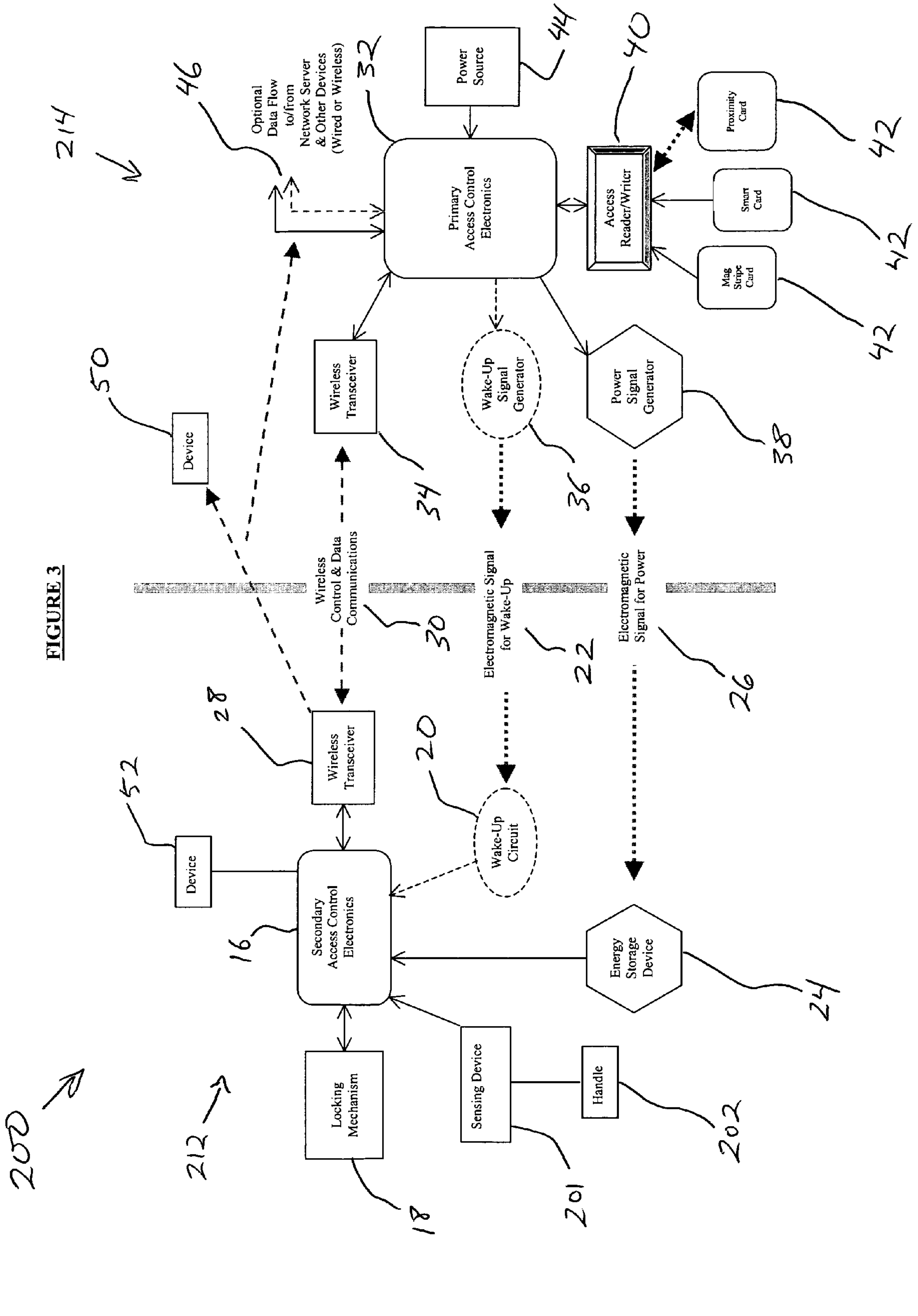
FIG. 3 is a schematic representation of a lock system in another embodiment of the invention.

Another alternative embodiment of the invention is shown in FIG. 3. Therein, an electronic lock system 200 includes all of the elements of the system 100 and further includes a sensing device 201 connected to the secondary control electronics 16 of the door lock unit 12. The sensing device 201 is disposed in or is connected to an exterior lock handle 202 of a door associated with the lock system 200. In use, an access card 42 is first presented to the reader 40 of the system 200 (i.e., inserted or swiped in the case of magnetic stripe or smart cards, or moved to a proximate location in the case of a proximity card). As discussed above with respect to FIG. 1, the reader 40 reads and evaluates data stored in the access card 42 to determine whether access is to be granted. The exterior lock handle 202 is then subsequently touched and/or slightly turned by the potential entrant. This touching/manipulation of the handle 202 activates the sensor 201 and resultantly causes internal circuitry to awaken the secondary control electronics 16 and to query the primary electronics 32 (via the wireless transceiver path described above) as to whether the lock should be unlatched. If the primary control electronics 32 are in receipt of proper access data from the presented access card 42, then the primary control 32 will instruct the secondary control 16 to unlatch (i.e., open) the lock as described above with respect to previous embodiments of the invention. Power is supplied to the door lock unit 212 of the system 200 by intermittent or continuous electromagnetic power signals 26 emitted by the power signal generator 38 as discussed above with reference to the system 10. That is, the system 200 does not necessarily require as much power as does the previously discussed system 100.

The electronic lock system 200 has thus far been described as not including the wake-up arrangement which is described above with respect to FIG. 1. In this configuration of the system 200, the door lock unit 212 may only be activated by the sensing device.

However, the lock system 200 may optionally include the wake-up arrangement, if such is desired for a particular application. That is, the lock control assembly 214 may include the wake-up signal generator 36 (shown in FIG. 3 in dashed lines) for selectively transmitting the electromagnetic wake-up signal 22. The door lock unit 212 may correspondingly include the wake-up circuit 20 (also shown in dashed lines) which receives the wake-up signal 22 and converts it to electrical energy used to activate the secondary access control electronics 16. In this configuration, the door lock unit 212 is not continuously powered by the power signal generator 38 and energy storage device 24, as described above concerning the system 100. Instead, the door lock unit 212 remains in an inactive state when operation of the unit 212 is not required. In this inactive state, as discussed above regarding the system 10, the electromagnetic power signal 26 is periodically transmitted by the power signal generator 36 to the energy storage device 24 which converts the signal 26 to electrical energy and stores the energy for subsequent powering of the door lock unit 212. Thus, in this configuration, the door lock unit 212 may be activated by either the sensing device 201 or by the wake-up circuit 20 and, when activated, is powered by electrical energy stored in the storage device 24.

The sensing device for activating the door lock unit, as described with regard to the system 200, is not limited to this particular embodiment. That is, any of the exemplary embodiments described herein and further embodiments contemplated within the broad scope of the invention may include a sensing device which, by touch or manipulation thereof, activates all or part of the electronic lock system. Such sensing device may be used in conjunction with or alternatively to the described wake-up circuit.

Figure 4:
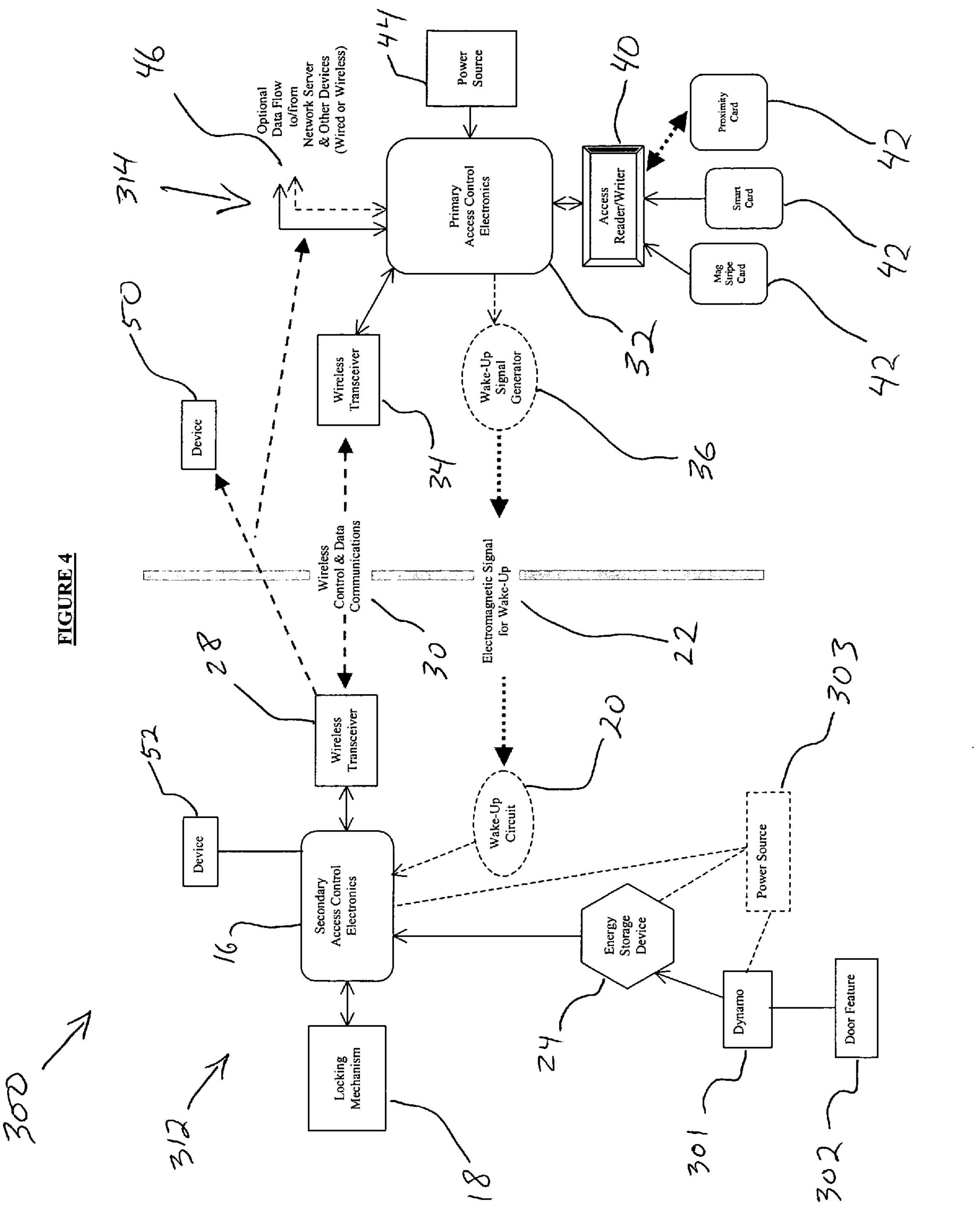
FIG. 4 is a schematic representation of a lock system in another embodiment of the invention.

FIG. 4 depicts an electronic lock system 300 in another alternative embodiment to the invention. The system 300 is similar to the system 10 except that the former does not require the power signal generator of the latter and optionally does not require the wake-up signal generator and wake-up circuit of the latter. Resultantly, the system 300 is powered and operated quite differently than the system 10.

The system 300 includes the energy storage device 24 as described above with reference to previous embodiments of the invention. However, here the energy storage device 24 receives electrical energy from a dynamo 301 connected mechanically to a feature 302 of a door associated with the system 300, for example, a handle of the door or the hinge of the door, etc. The dynamo 301 is actuated by movement of the door feature 302 and is capable of supplying sufficient electrical energy to the energy storage device 24 to impart the required charge on the device 24. Thus, the door lock unit 312 has available power, as needed, stored in the energy storage device 24. The dynamo 301 generates sufficient electrical energy from a single actuation of the door feature 302 to permit multiple operations of the door lock unit 312, i.e., multiple entries of the door.

The system 300 operates similarly to previously disclosed embodiments of the invention but does not require the wake-up and power signal generation, transmission, and reception processes. Instead, the system 300 is powered internally by the interaction of the energy storage device 24 and the dynamo 301. That is, the energy storage device 24 remains charged by action of the dynamo 301.

During use of the system 300, the dynamo 301 also triggers the storage device 24 to awaken the inactive lock unit 312. That is, when the door feature 302 is maneuvered, the dynamo 301 is actuated and transmits a power signal to the energy storage device 24 which is received and stored thereby. As discussed in further detail below, the energy storage device 24 includes discrete logic components which, in response to the dynamo power signal, send an activation signal to the secondary control electronics 16 that wakes up and activates the control electronics 16.

The system 300 may be used, for example, as follows. A potential entrant first presents his/her access card 42 to the control assembly 314 which attempts to verify the entrant's credentials. After presenting the access card 42, the entrant maneuvers the door feature 302, e.g., the door handle, and activates the dynamo 301 which sends a power signal to the energy storage device 24. The power signal is received by the storage device 24 and, as mentioned above, is converted therein to stored energy. Further, in response to the power signal, the energy storage device 24 awakens the lock unit 312. Upon verification of the access card 42, the control assembly 314 transmits an 'unlock' signal 30 via the wireless transceivers 34 and 28 to the awakened lock unit 312 which then unlocks the locking mechanism 18 and confirms such unlocking to the control unit 314 via the transceivers.

As mentioned, in this embodiment, the system 300 does not require the wake-up signal generator, the wake-up circuit, nor the power signal generator discussed, for example, with respect to the system 10. However, the system 300 may optionally employ the wake-up arrangement if desired. That is, the lock control assembly 314 may include the wake-up signal generator 36 (shown in dashed lines in FIG. 4) and the door lock unit 312 may correspondingly include the wake-up circuit 20 disposed for receiving the electromagnetic wake-up signal 22 from the generator 36 and converting the signal 22 to electrical energy used to activate the secondary control electronics 16, as is discussed previously with regard to other embodiments of the invention.

For example, in addition to or alternatively from using the dynamo 301 to awaken the lock unit 312 as just previously discussed, the wake-up signal generator 36 and the wake-up circuit 20 may be employed. That is, a potential entrant may present his/her access card 42 to the control assembly 314 which, upon verification, sends the electromagnetic wake-up signal 22 via the generator 36 to the lock unit 312. The wake-up circuit 20 receives the signal 22 and awakens the secondary access control electronics 16. Then, the control assembly 314 transmits an 'unlock' signal 30 to the secondary control electronics 16 by way of the wireless transceivers 34 and 28. In response to the signal 30, the control electronics 16 unlocks the locking mechanism 18 and confirms the unlocking to the control assembly 314. Once awakened, the lock unit 312 draws operational power from the energy storage device 24. As mentioned, the storage device 24 is charged by action of the dynamo 301. That is, when the potential entrant presents his/her access card 42 to the control assembly 314, he/she will maneuver the door feature 302 and thus actuate the dynamo 301 and cause the dynamo 301 to send its power signal to the energy storage device 24 which converts the signal to stored energy for present or future operation of the lock unit 312.

Additionally, the door lock unit 312 of the electronic lock system 300 may further include a power source 303 (also shown in dashed lines) connected to the energy storage device 24 and/or to the secondary access control electronics 16. The power source 303 comprises a back up power supply and may be a traditional or rechargeable battery or battery pack. If the backup power source 303 is a rechargeable battery pack or any appropriate means to store electrical power, the dynamo 301 would also be connected to such power source 303 in order to recharge the latter upon operation of dynamo 301. (This relationship is represented in FIG. 4 in dashed lines.) Thus, for example, in instances where a significant time period lapses between activations of the dynamo 301 and the charge on the energy storage device correspondingly dissipates, the charge may be replenished by the power source 303. Alternatively, where the power source 303 is directly connected to the secondary control electronics 16, power may be supplied directly to the electronics 16 for activation and operation thereof.

The dynamo and power source features described with respect to the system 300 are, of course, not limited to this embodiment of the invention. These features may be applied, singularly or in combination, to the other embodiments described herein and those additional embodiments contemplated by the broad scope of the invention.

The energy storage device 24 described hereinabove with reference to the systems 10, 100, and 200 further includes the optional capability of detecting the electromagnetic power signal 26 emitted by the power signal generator 38 and of awakening the secondary access control electronics 16 in response to a detected change in characteristic of the received power signal 26. This change in signal characteristic may include at least one of a termination of the power signal 26, a temporary suspension of the power signal 26, and a variance in modulation of the power signal 26.

In this embodiment of the invention, discrete logic components of the energy storage device 24 detect the change in characteristic of the power signal 26 and, in response thereto, wake-up the door lock unit 12. Once awakened, the door lock unit 12 is operable as discussed above with regard to the previous embodiments of the invention.

For example, the energy storage device may detect a termination of the power signal 26. Upon such detection, the energy storage device 24 awakens the secondary electronics 16 which then transmits a message via the wireless transceiver 28 to the lock control assembly 14, 114, 214 and/or directly to the network 46 and/or to a peripheral device (see discussion below). The message can, for example, be an alert that the power signal 26 has ceased and that the system 10, 100, 200 requires maintenance.

In another example, the temporary suspension of the power signal 26 may be used to purposely wake-up the secondary electronics 16. That is, in addition to or alternatively from the wake-up signal/wake-up circuit routine described hereinabove, the power signal 26 may be purposefully temporarily suspended by the generator 38. This suspension is detected by the energy storage device 24 which, in response, wakes-up and activates the secondary electronics 16 of the lock 12, 112, 212. Thereafter, the lock 12 may perform as described in various embodiments above.

Similarly, the modulation of the power signal 26 may be varied in order to signal the energy storage device 24 to awaken the lock 12, 112, 212. That is, such variance may be detected by the discrete logic components of the energy storage device 24 which, in response thereto, awakens the lock which is then operable as desired.

Returning to the electronic lock system 300 of FIG. 4, the discrete logic components of the energy storage device 24 therein may be configured to detect a prolonged time period between successive power signals sent to the storage device 24 by activations of the dynamo 301. The energy storage device 24 may be further configured to detect when its stored energy reaches a predetermined minimum value. In the case of such detections, the energy storage device 24 may awaken the secondary electronics 16 thus activating the door lock unit 312 and enabling operation and/or communication thereof. Such communication could for example be the transmission of a message that the system 300 requires maintenance. Further, upon such detection, the device 24 may additionally or alternatively draw power from the power source 303.

The wireless transceiver 28 of the lock device 12, 112,212, 312 has thus far been described, by way of example, as being configured to wirelessly communicate and/or exchange data, etc. with the corresponding lock control assembly 14, 114, 214, 314 and particularly with the wireless transceiver 34 of the primary access control electronics 32. Additionally and/or alternatively, the wireless transceiver 28 may be disposed to communicate with a device 50, as shown in FIGS. 1-4, which is not a direct component of the lock control assembly. Such device 50 may include, for example, a thermostat, a set-top box, a lighting control module, telephone/control console, or an auxiliary communication device. Further, the wireless transceiver 28 may be configured to interact wirelessly in a direct manner with the network, without interfacing with the lock control assembly.

In still another exemplary embodiment, the secondary access control electronics 16 of the door lock unit 10, 100, 200, 300 may be configured to communicate with a device 52 disposed, for example, in the door lock unit or elsewhere in the door in which the door lock unit is located. The device 52 may include, for example, a visual, auditory, or tactile signal device, a camera, a further communication device, etc. The secondary access control electronics 16 may interact with the device 52 by any suitable wired or wireless arrangement. Where a wireless arrangement is employed, the secondary access control electronics 16 may communicate with the device 52 via the wireless transceiver 28. The device 52 may be powered by the energy storage device 24 or may include its own source of power. The device 52 may be activated by the wake-up circuit 20 or by its own similar wake-up circuit arrangement or by the energy storage device 24 as described immediately above. Of course, the invention contemplates various combinations and modifications of these and the additionally discussed exemplary embodiments.

Access of the electronic lock system has been described herein by way of example as comprising identification card access techniques involving magnetic stripe cards, smart cards, and proximity cards. However, the electronic lock system of the invention is not limited to such card access configurations. For example, a potential entrant may attempt to access the electronic lock system by way of a key, a keypad, a touch pad or screen, or by way of biometric means such as a fingerprint scan, a retinal scan, etc., or any other known or conceivable access means, techniques, or credentials.

Figure 5:
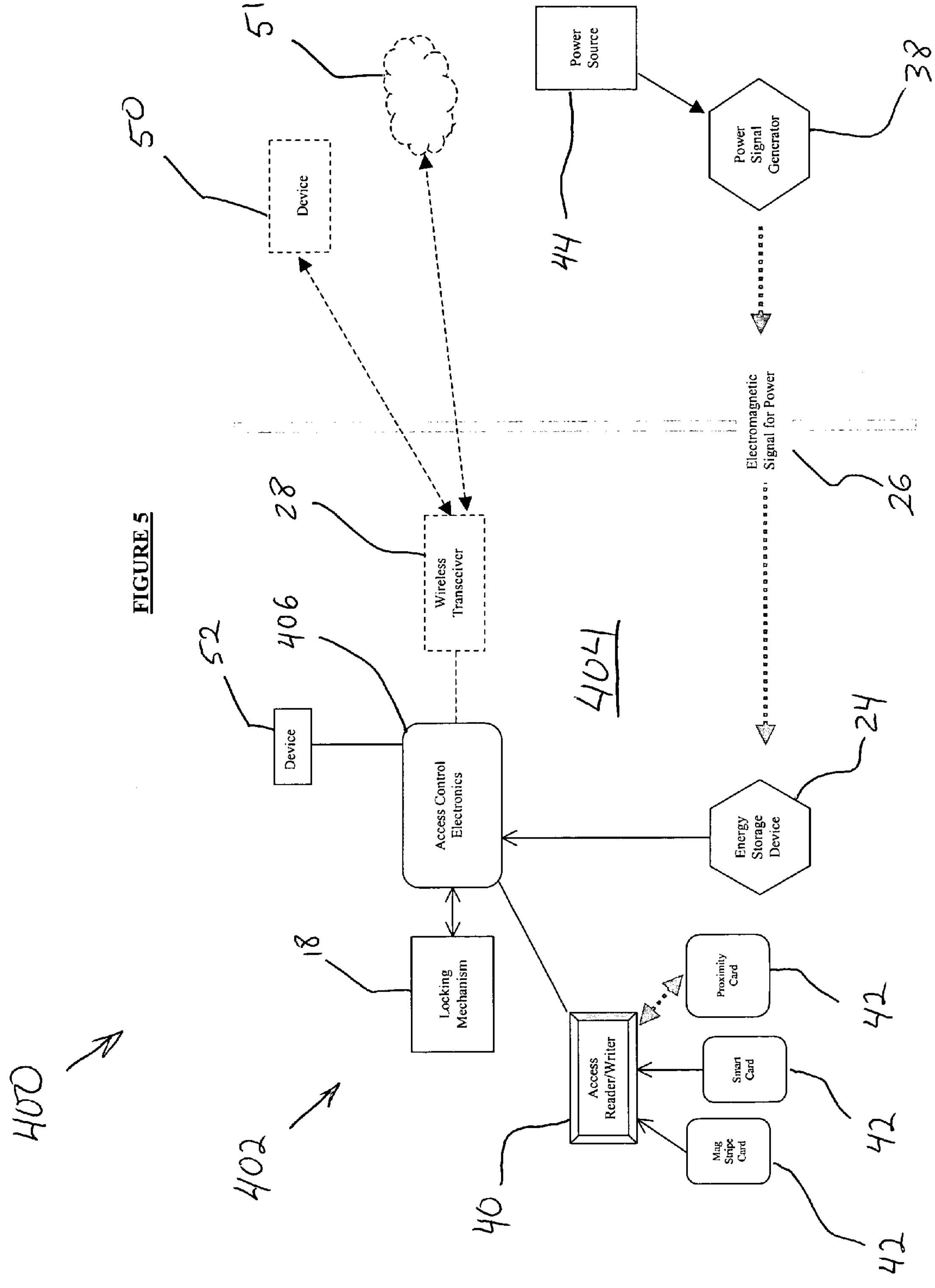
FIG. 5 is a schematic representation of a lock system in another embodiment of the invention.

FIG. 5 shows an electronic lock system 400 in an additional embodiment of the invention. The system 400 is composed of a door lock unit 402 disposed within a door 404 and is further composed of the power signal generator 38 discussed above with regard to the electronic lock systems 10, 100, 200, and 300.

The power signal generator 38 is disposed external to door lock unit 402 and external to the door 404. The power signal generator 38 is powered by the power source 44 which, as discussed previously, may be a switch mode power supply, a transformer, a traditional or rechargeable battery pack, or any combination thereof.

The door lock unit 402 includes access control electronics 406 comprising a microprocessor (not shown) and an actuator (not shown) that is connected to the locking mechanism 18 and is capable of selectively actuating the locking mechanism 18 into a locked or unlocked position. The door lock unit 402 further includes the access reader/writer 40 connected to the access control electronics 406. The access reader/writer 40 is configured for reading access credentials from the access cards 42 (e.g., data from magnetic stripe cards, smart cards, proximity cards, etc.), for sending such data to the access control electronics 406, and for alerting the door lock unit 402 of an access attempt by a potential entrant (as will be discussed further below). The access control electronics 406 is configured for processing the access credentials read by the access reader/writer 40 and for determining whether access is to be permitted. This determination involves, for example, a comparison of the read access credentials to stored data which is stored locally in the access control electronics 406.

The door lock unit 402 of the system 400 also includes the energy storage device 24 (e.g., a super-capacitor) connected to the access control electronics 406 and to the access reader/writer 40. As discussed at length above, the energy storage device 24 is configured to receive the electromagnetic signals 26 from the power signal generator 38 and is further configured to convert those signals 26 to capacitively stored electrical energy. This electrical energy stored within the storage device 24 is selectively provided to the access control electronics 406 as operational power. The storage device 24 further includes discrete logic components which receive a signal from the access reader/writer 40 upon an access attempt and which, in response to such signal, awaken the access control electronics 406.

The power signal generator 38 continuously or intermittently transmits the power signal 26 to the energy storage device 24 such that the device 24 remains charged and capable of providing operational power to the access control electronics 406 as needed. The access control electronics 406 remain in an inactive, low-power state (as discussed previously with regard to locks 12, 112, 212, and 312) until awakened by the energy storage device 24.

An example of a typical operation of the system 400 begins with a potential entrant presenting the access card 42 to the access reader/writer 40 by swiping, inserting, or bringing the card 42 proximate to the reader 40. The access reader/writer 40 senses the access attempt and sends the appropriate signal to the energy storage device 24 which, in response, awakens the access control electronics 406. Substantially simultaneously, the access reader/writer 40 reads the potential entrant's access credentials, as presented by the access card 42, and sends corresponding data to the awakened access control electronics 406. The control electronics 406 determine whether the data is appropriate to permit access to the door 404 by comparing the read data with the data stored locally in the access control electronics 406. If the determination is positive, the access control electronics 406 then unlock the locking mechanism 18 and permit access to the entrant.

In an alternative embodiment, the door lock unit 402 is maintained in a constant state of activation and readiness. That is, in this alternate embodiment, the access control electronics 406 do not require wake-up activation. Instead, the energy storage device 24 continuously provides operational power to the access control electronics 406. Correspondingly, the power signal generator 38 continuously or intermittently provides the signal 26 to maintain the necessary charge on the energy storage device 24 to thus provide the door lock unit 402 with continuous operational power. In this embodiment, an access attempt by a potential entrant is read by the access reader/writer 40 and the access credentials are sent directly to the active access control electronics 406 to evaluate the credentials and either grant or deny access to the door 404. That is, in this embodiment, awakening of the access control electronics 406 is not required.

The electronic lock system 400 may include features and elements from the previously discussed embodiments. For example, the door lock unit 402 may include the sensing device 201 and the handle 202 of the electronic lock system 200. Additionally and/or alternatively, the door lock unit 402 may include the dynamo 301 and the door feature 302 of the system 300.

Further, the electronic lock system 400 may optionally include the wireless transceiver 28 as discussed above with respect to previous embodiments and as shown in FIG. 5 in dashed lines. The access control electronics 406 may communicate wirelessly via the wireless transceiver 28 with the device 50 disposed external to the door 404 in which the lock system 400 is disposed. As discussed hereinabove, the device 50 may be any device or plurality of devices external to the door and may, for example, include at least one of a thermostat, a set-top box, a lighting control module, telephone/control console, an auxiliary communication device, etc. Additionally and/or alternatively, the access control electronics 406 may communicate wirelessly via the wireless transceiver 28 with a network 51 shown by graphical representation in FIG. 5. The network 51 may be any type of network associated with the multi-unit dwelling in which the door 404 and lock system 400 are installed. For example, the network 51 may comprise a central electronic lock control system (CELS) backbone of the multi-unit building, the internet, etc. The manner and mode by which the wireless transceiver supports and facilitates such communications is discussed hereinabove and is thus not presently restated.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best modes contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. An electronic lock system, comprising:

an electronic lock disposed in a door;

a controller disposed outside of the door in a fixed location proximate to the door;

an energy storage device disposed in the door connected to the electronic lock; and an access device by which the electronic lock may be accessed;

wherein the controller is configured to communicate wirelessly with the electronic lock and to provide wireless power to the electronic lock;

wherein the controller comprises a fixed and dedicated source of continuous wireless power to the energy storage device disposed in the door; and wherein the energy storage device is configured; to receive and store the wireless power; to provide power to the electronic lock to operate the lock one or multiple times over an extended time period; and to maintain the lock in a constant state of powered readiness in which the electronic lock selectively grants access to an entrant and communicates with the controller.

2. The electronic lock system of claim 1, wherein the controller is configured to generate a wireless activation signal, wherein the electronic lock is activated in response to the activation signal, and whereby the electronic lock becomes operable.

3. The electronic lock system of claim 2, wherein the controller comprises a wake-up signal generator configured to generate the wireless activation signal and wherein the electronic lock comprises a wake-up circuit configured to receive the wireless activation signal and to convert the wireless activation signal into electrical energy used to activate the electronic lock.

4. The electronic lock system of claim 2, wherein the controller is configured to generate the wireless activation signal upon the controller verifying user data read by the access device.

5. The electronic lock system of claim 4, wherein the access device is configured to read the user data from an access card presented by the user to the access device.

6. The electronic lock system of claim 5, wherein the access card comprises at least one of a magnetic stripe card, a smart card, and a proximity card.

7. The electronic lock system of claim 1, wherein the controller is further configured to generate a wireless power signal and wherein the electronic lock is powered in response to the power signal.

8. The electronic lock system of claim 7, wherein the energy storage device is configured to receive the power signal and to convert the power signal to stored electrical energy.

9. The electronic lock system of claim 8, wherein the energy storage device comprises a capacitor.

10. The electronic lock system of claim 7, wherein the power signal comprises a pulsed or continuous generation of electromagnetic emissions.

11. The electronic lock system of claim 8, wherein when the electronic lock becomes operable, the electronic lock is powered by the stored electrical energy.

12. The electronic lock system of claim 7, wherein the door comprises a door of a single unit of a multi-unit building and wherein the controller is connected to a network associated with a multi-unit building.

13. The electronic lock system of claim 1, wherein the electronic lock comprises a sensing device configured to sense an operation of the door, wherein the electronic lock is activated in response to the sensing of the operation of the door, and whereby the electronic lock becomes operable.

14. The electronic lock system of claim 13, wherein the operation or the door comprises at least one of a touching and a manipulation of an exterior handle of the electronic lock.

15. The electronic lock system of claim 1, wherein the controller provides said power to the electronic lock by selective transmission of a wireless signal to the electronic lock, wherein the electronic lock is configured to receive the wireless signal, to convert the wireless signal into electrical energy, and to use the electrical energy to activate the electronic lock so the lock becomes operable and/or to operate the electronic lock once operable.

16. An electronic lock system, comprising:

an electronic lock disposed in a door; and a controller disposed proximate to the door and connected to a power source for providing power to the controller;

wherein the controller includes an access device by which the electronic lock may be accessed;

wherein the controller is configured to communicate wirelessly with the electronic lock;

wherein the electronic lock includes a dynamo configured to provide power to the lock;

wherein the electronic lock further comprises an energy storage device disposed for receiving and storing energy provided by the dynamo;

wherein the energy storage device is configured to detect an extended time period between successive occurrences of the dynamo providing power to the lock and wherein the energy storage device is further configured to activate the lock in response to said extended time period and/or to draw power from an alternate power source in response to said extended time period.

17. The electronic lock system of claim 16, wherein manipulation of a feature of the door drives the dynamo to provide the power to the electronic lock.

18. The electronic lock system of claim 16, wherein the feature of the door comprises at least one of a door handle and a door hinge.

19. A method of operating an electronic lock disposed in a door, the method comprising:

presenting an access card to an access device disposed in communication with a controller disposed outside of the door in a fixed location proximate to the door, the access card including stored identification data;

processing the identification data at the controller;

generating a wireless signal at the controller where the identification data is acceptable;

transmitting the wireless signal to the electronic lock;

operating the electronic lock in response to the activation signal;

continuously providing wireless power from the controller to an energy storage device disposed in the door and connected to the electronic lock;

storing the power in the energy storage device and providing power from the energy storage device to the electronic lock to operate the electronic lock one or multiple times over an extended time period; and maintaining the lock in a state of constant powered readiness in which the electronic lock selectively grants access to an entrant and communicates with the controller.

20. The electronic lock system of claim 1, wherein the electronic lock is configured for wireless communication with at least one of a network and a room device.

21. The electronic lock system of claim 8, wherein the energy storage device is configured to detect a variation of the power signal and to activate the lock in response to said variation.

22. An electronic lock system, comprising:

an electronic lock disposed in a door;

a controller disposed outside of the door in a fixed location proximate to the door; and an energy storage device disposed in the door connected to the electronic lock;

wherein the controller includes an access device by which the electronic lock may be accessed;

wherein the controller is configured to communicate wirelessly with the electronic lock and to provide wireless power to the electronic lock;

wherein the controller comprises a fixed and dedicated source of continuous wireless power to the energy storage device disposed in the door; and wherein the energy storage device is configured to receive and store the wireless power and to provide power to the electronic lock to operate the lock one or multiple times over an extended time period;

wherein the controller is further configured to generate a wireless power signal and wherein the electronic lock is powered in response to the power signal;

wherein the energy storage device is configured to receive the power signal and to convert the power signal to stored electrical energy;

wherein the energy storage device is configured to detect a variation of the power signal and to activate the lock in response to said variation;

wherein said variation comprises at least one of a temporary suspension of the power signal and a variation of a modulation of the power signal.

23. The electronic lock system of claim 16, wherein the electronic lock is configured to communicate wirelessly with at least one of a network and a room device.

24. The method of claim 19, further comprising:

the storage device detecting a variation of the wireless activation signal; and activating and rendering operable the electronic lock in response to said variation.

25. A method of operating an electronic lock disposed in a door, the method comprising:

presenting an access card to an access device of a controller disposed outside of the door in a fixed location proximate to the door, the access card including stored identification data;

processing the identification data at the controller;

generating a wireless activation signal at the controller where the identification data is acceptable;

transmitting the wireless activation signal to the electronic lock;

activating and rendering operable the electronic lock in response to the activation signal;

continuously providing wireless power from the controller to an energy storage device disposed in the door and connected to the electronic lock;

storing the power in the energy storage device and providing power from the energy storage device to the electronic lock to operate the electronic lock one or multiple times over an extended time period;

the storage device detecting a variation of the wireless activation signal;

activating and rendering operable the electronic lock in response to said variation wherein said variation comprises at least one of a temporary suspension of the power signal and a variation of a modulation of the power signal.

26. An electronic lock system, comprising:

an electronic lock disposed in a door;

an access device by which the lock may be accessed;

a power signal generator disposed external to the door and configured to provide continuous wireless power to the electronic lock; and an energy storage device disposed in the door and connected to the electronic lock;

wherein the energy storage device is configured; to receive and store the wireless power; to provide power to the electronic lock to operate the lock one or multiple times over an extended time period; and to maintain the lock in a constant state of powered readiness in which the electronic lock selectively grants access to an entrant.

27. The electronic lock system of claim 26, wherein the access device is configured to detect access credentials of a potential entrant, the electronic lock further including a controller configured to verify the access credentials and to lock and unlock the electronic lock.

28. The electronic lock system of claim 27, wherein the energy storage device is configured to receive a power signal from the power signal generator and configured to convert the power signal to stored electrical energy.

29. The electronic lock system of claim 28, wherein the energy storage device comprises a capacitor and wherein the power signal comprises a pulsed generation of electromagnetic emissions.

30. The electronic lock system of claim 28, wherein the energy storage device is configured to activate the electronic lock in response to the access device detecting the access credentials, whereby the electronic lock becomes operable.

31. The electronic lock system of claim 26, wherein the door comprises a door of a single unit of a multi-unit building and wherein the lock is disposed to wirelessly communicate with an item external to the door.

32. The electronic lock system of claim 31, wherein the item external to door comprises at least one of a device disposed adjacent to the door, a device disposed within the single unit, and a network.

33. An electronically operable lock system for a door, comprising:

an electronically operable lock configured to be installed at the door;

a receiver configured to receive wireless power and to provide said power received to the lock, the lock being operable electronically by means of power received;

a transmitter configured to transmit continuous wireless power to the receiver and configured to be fixedly disposed external to the door and in sufficient proximity to the door to facilitate propagation of power from the transmitter to the receiver; and a controller in wireless communication with the lock to control operation of the lock; and an energy storage device disposed in the door, connected to the electronic lock, and in operable communication with the receiver, wherein the energy storage device is configured; to receive and store the wireless power; to provide power to the electronic lock to operate the lock one or multiple times over an extended time period; and to maintain the lock in a constant state of powered readiness in which the electronic lock selectively grants access to an entrant and communicates with the controller.

34. A method of electronically operating a lock at a door, comprising:

wirelessly transmitting power to the lock from a fixed location separate from the door that is sufficiently proximate to the door to facilitate propagation of power to the lock;

wirelessly receiving power at the lock to electronically operate the lock utilizing power received;

controlling operation of the lock by wireless communication;

storing the received power in an energy storage device disposed in the door and connected to the lock;

providing power to the electronic lock from the energy storage device to operate the lock one or multiple times over an extended time period; and maintaining the lock in a state of constant powered readiness in which the electronic lock selectively grants access to an entrant and communicates with the controller.

* * * * *